United States Patent [19]

Grandos

[11] Patent Number: 4,660,040
[45] Date of Patent: Apr. 21, 1987

[54] TARGET RANGE SENSING APPARATUS

[75] Inventor: Norman Grandos, Fort Wayne, Ind.

[73] Assignee: Magnavox Government and Industrial Electronics Company, Fort Wayne, Ind.

[21] Appl. No.: 752,711

[22] Filed: Jul. 8, 1985

[51] Int. Cl.$^4$ .............................................. G01S 13/32
[52] U.S. Cl. ..................................... 342/128; 342/68; 342/193
[58] Field of Search ................... 343/5 HM, 7 PF, 14; 342/68, 128, 193

[56] References Cited

U.S. PATENT DOCUMENTS

| | | | |
|---|---|---|---|
| 2,907,023 | 9/1959 | Skinner | 342/128 |
| 3,149,330 | 9/1964 | Flocco | 342/122 X |
| 3,173,138 | 3/1965 | Erst | 343/14 |
| 3,339,198 | 8/1967 | Glegg | 343/14 |
| 3,343,164 | 9/1967 | Clarke | 342/122 X |
| 3,789,398 | 1/1974 | Erst | 342/128 |
| 3,992,711 | 11/1976 | Stoakes | 343/14 X |
| 4,302,758 | 11/1981 | Tomasi | 343/14 X |
| 4,354,192 | 10/1982 | Kohler | 343/14 |

Primary Examiner—T. H. Tubbesing
Attorney, Agent, or Firm—Thomas A. Briody; William J. Streeter; Richard T. Seeger

[57] ABSTRACT

A carrier frequency is frequency modulated with a triangular wave and transmitted from a sensor to a target having relative motion to the sensor. The reflection from the target is received and mixed with a portion of the transmitted signal. At least two harmonics of the modulating frequency are filtered from the output of the mixer. Each harmonic is synchronously detected with an harmonic of the same frequency to obtain a doppler signal that is detected and fed to a comparator. Each harmonic, and its corresponding doppler envelope, amplitude peaks at a respective range to the target. When the doppler of one harmonic exceeds the doppler of another harmonic in amplitude, a predetermined range to the target is signaled by the comparator.

7 Claims, 3 Drawing Figures

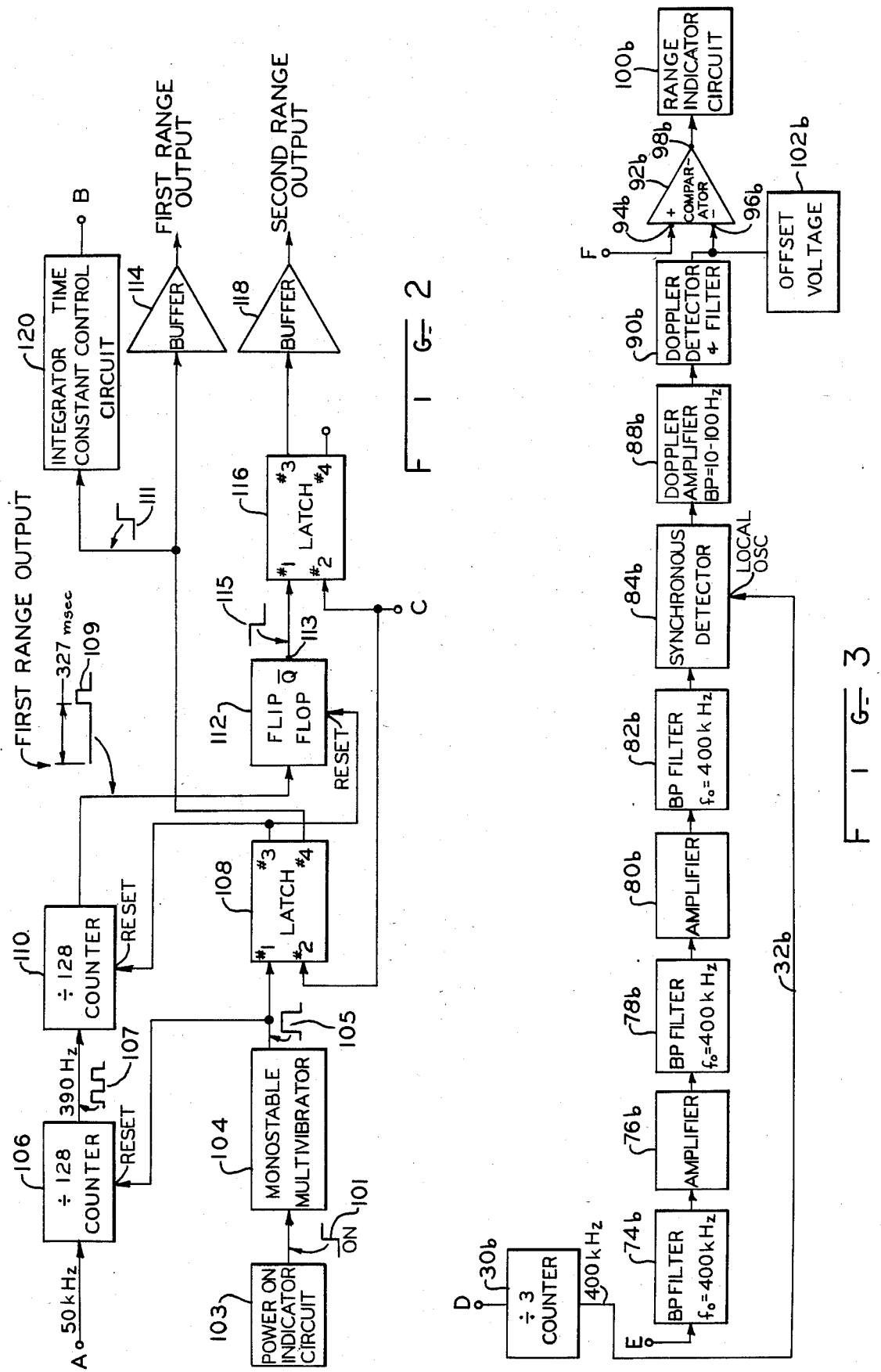

TARGET RANGE SENSING APPARATUS

BACKGROUND OF THE INVENTION

1. Field of the Invention

This invention is in the field of FM-CW (frequency modulated continuous wave) radar systems and more particularly to such systems using a harmonic of the modulating frequency for determining target range.

2. Description of the Prior Art

FM-CW radar systems using the doppler of a harmonic of the modulating frequency are disclosed in "Introduction to Radar Systems", Second Edition, by Merrill I. Skolnik, published by McGraw-Hill Book Company, New York, N.Y., in particular Chapter 3, pp 88–91. A rigorous mathematical treatment of this subject can be found in "Resolution in Frequency Modulated Radars" by Louis Mario Tozzi, in particular pp 39–58, published by University of Maryland, College Park and Baltimore, Md. in 1972.

SUMMARY OF THE INVENTION

In general, an FM-CW signal transmitted from a sensor to a target is reflected from the target with the reflection mixed with the transmitted signal to obtain harmonics of the modulating frequency. As used herein, "sensor" denotes the entire circuit and associated components for sensing range. The reflected signal is delayed proportionately to the round trip travel of the transmitted signal. The delay determines at what frequency the envelope of the harmonic spectra peaks. This frequency corresponds to the instantaneous frequency difference which results from the delay between the transmitted and reflected signals. The instantaneous phase difference between the transmitted and reflected signals also determines the amplitude of the signal from the mixer since it is proportional to the vector sum of the transmitted and reflected signals.

When the target moves one half wavelength relative to the sensor antenna the round trip travel of a reflected signal is changed by one full RF (radio frequency) wavelength. This causes the phase of the received signal to change 360° relative to the transmitted signal and the mixer output to null and peak as the target moves one half wavelength. The rate at which the target moves relative to the sensor antenna determines the frequency at which the post mixer harmonic signals are thus amplitude modulated. This modulation frequency corresponds to the doppler frequency shift of the reflected signal.

This invention improves over the prior art by selecting a plurality of harmonics in an FM-CW radar system and comparing the amplitudes of their respective doppler envelopes to provide a signal when each of one or more specific ranges to the target have been reached. Two harmonics of the modulating frequency with a given frequency deviation are used to determine a specific target range. By varying the frequency deviation or adding additional harmonics and comparing their respective doppler envelopes additional target ranges can be obtained. As the sensor moves towards the target, the main lobe of the harmonic spectra envelope sweeps down in frequency. In the instance where the sensor moves away from the target the peak of the envelope sweeps up in frequency. Thus at a particular range from the target, a particular harmonic will be dominant, the higher harmonics being dominant at correspondingly greater ranges.

In one embodiment a carrier frequency is generated and divided down to obtain two frequencies which are selected harmonics of a triangular modulating frequency, which is that frequency which modulates the RF signal transmitted to the target. The reflection signal from a target having relative motion to the sensor is received and mixed with the transmitted signal and the mixed signal contains all the harmonics of the modulating frequency, each harmonic having a doppler frequency envelope. Tuned filter circuits separate two harmonics from the mixed signal which correspond in frequency to the two previously selected harmonics. The two harmonics from the mixed signal are synchronously detected using the two previously selected harmonics to obtain two respective doppler frequency signals which are detected. One detected doppler signal is fed to a noninverting input of a comparator and another doppler signal is fed to the inverting input of the comparator.

As the sensor moves relative to the target the amplitude of one of the doppler signals is greater than the other doppler signal to inhibit the output of the comparator from going "high" and as the sensor goes through a first range relative the target, the other doppler signal exceeds the one doppler signal causing the output of the comparator to go "high". This change in the comparator output signal can then be used for any desired purpose. For example, in the case where the target is an earth surface and the range sensor apparatus is in a falling explosive charge, the charge may be fuzed by the comparator output at a given altitude above the surface.

Each harmonic peaks at a corresponding range to the target as explained in the aforementioned Skolnik and Tozzi publications and the range at which a given harmonic peaks depends on the frequency deviation of the modulating frequency. In this invention, the respective range at which each of the two harmonics peak and thus the range at which the comparator output occurs may be varied by correspondingly varying the frequency deviation, or frequency excursion, of the modulating signal. In one embodiment of this invention, the comparator output is fed back to the frequency modulator of the transmitted signal to automatically change the frequency deviation of the modulating frequency so that the comparator will have a second output at a second range using the same two harmonics. In another embodiment of this invention, a third harmonic is used having the same processing as the first two harmonics and a second comparator is used with a doppler signal of one of the first two harmonics being fed to the noninverting input of the second comparator and the doppler signal of the third harmonic being fed to the inverting input of the second comparator. The second comparator output then goes from "low" to "high" as the relative movement between the sensor and the target reaches a second range. Outputs for as many different ranges as desired, within the constraints imposed by the system parameters, may be obtained either by changing the frequency deviation of the modulating signal for each successive output of a comparator or by adding harmonics and comparators.

Therefore it is an object of this invention to provide a target range sensing apparatus using an FM-CW radar system which provides a signal at a given target range.

It is another object of this invention to utilize in the system of the previous object a plurality of harmonics of the modulating frequency.

A further object of this invention is to compare the relative amplitudes of the doppler signals of the plurality of harmonic signals to obtain a target range indicating signal.

Another object of this invention is to provide in the systems of the previous objects sensing apparatus for providing a signal at each of a plurality of distinct target ranges.

Another object of this invention is to provide a feedback signal in the apparatus of the previous object to the frequency modulator of a transmitted signal to change the frequency deviation of the frequency modulating signal and thus change the range at which the harmonics peak in amplitude.

The above mentioned and other features and objects of this invention and the manner of obtaining them will become more apparent and the invention itself will be best understood by reference to the following description of an embodiment of the invention taken in conjunction with the accompanying drawings.

BRIEF DESCRIPTION OF THE DRAWINGS

FIG. 2 is a schematic block diagram having connection points A, B and C for connection to points A, B and C, respectively, of the diagram of FIG. 1 for changing the frequency deviation upon a first output from the comparator to provide a second range indication; and FIG. 3 is a schematic diagram having connection points D, E and F for connection to points D, E and F, respectively, of the diagram of FIG. 1 for adding an additional harmonic channel to provide a second range indication.

DESCRIPTION OF THE PREFERRED EMBODIMENTS

Figure 1:
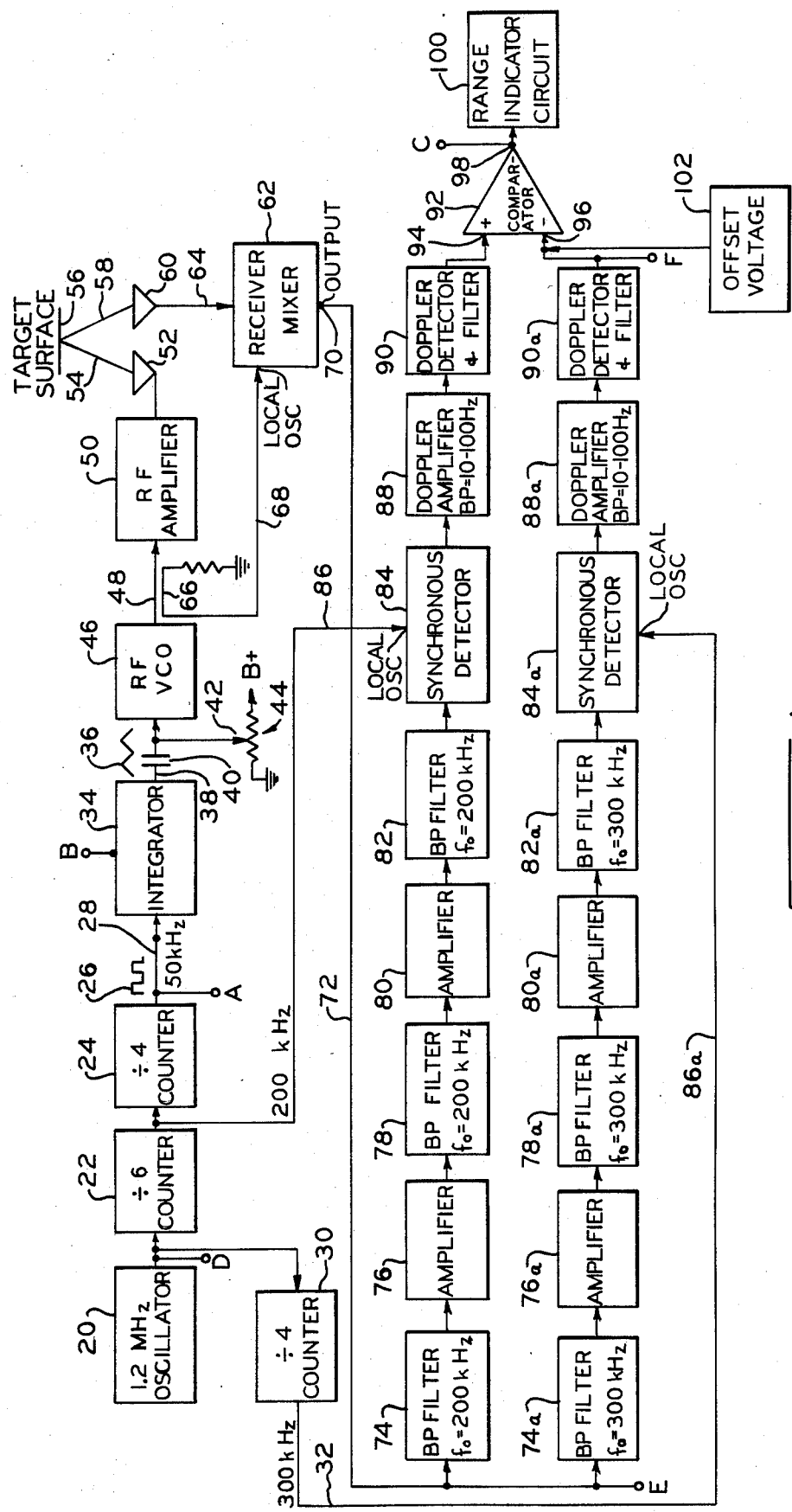
FIG. 1 is a schematic block diagram of a sensor of this invention having connection points A–F.

The apparatus of this invention provides target distance range sensing to provide a signal when an approaching or receding target reaches a predetermined range from the sensor. An application for this invention is in a fuze height sensor wherein a fuze is used to set off a bursting charge of a falling projectile at a given height above the ground or water surface.

Referring to the sensor of FIG. 1, oscillator 20 generates a 1.2 MHz square wave which is coupled to divide by six counter 22 where the square wave is divided by six and which is coupled to divide by four counter 24 where the square wave is further divide by four to provide a 50 kHz square wave 26 in line 28. "Counter" as used herein refers to frequency divider circuits well known in the art for dividing down frequency. Divide by four counter 30 is coupled to oscillator 20 where the 1.2 MHz is frequency divided by four to provide a 300 kHz square wave in line 32 for purposes which will become apparent. Integrator 34 is coupled to line 28 and integrates the square wave therein to provide a 50 kHz triangular wave 36 in line 38 in which is placed a DC (direct current) blocking capacitor 40 and to which is coupled tap 42 of voltage divider 44 having a voltage of B+ applied to one end and is grounded at the other end. Line 38 is coupled to RF (radio frequency) VCO (voltage controlled oscillator) 46 which frequency modulates an RF carrier frequency, having a suitable center frequency, in accordance with triangular modulating wave 36 to provide an FM-CW RF carrier on line 48 which is coupled to RF amplifier 50 which amplifies the FM-CW signal. VCO 46 is tuned to the desired center frequency by voltage divider 44 as is well known in the art. Amplifier 50 is coupled to transmitting antenna 52 which transmits the FM-CW signal 54 to the target which, as mentioned, may be an earth surface 56.

Signal 54 is reflected from surface 56 and reflection 58, which is doppler phase shifted and is range time shifted, is received by antenna 60 which is coupled to receiver mixer 62 by line 64. Mixer 62 may be a double balanced mixer for improved mixing characteristics. Antennas 52, 60 could also take other forms as is known in the art. Directional coupler 66 couples the FM-CW signal on line 48 having the phase of the transmitted signal 54 to mixer 62 by line 68 where it acts as an LO (local oscillator) signal input to mixer 62. At output terminal 70 of mixer 62 is a mixed signal which contains all of the harmonics of the reflected modulating frequency. Terminal 70 is coupled to a tuned filter channel for each of two harmonics, in this example the fourth and sixth harmonics, where doppler frequency signals which modulate the respective harmonics are recovered. Each channel is identical except that one channel is tuned to the fourth harmonic and the other channel is tuned to the sixth harmonic. The blocks for the sixth harmonic channel that correspond to the fourth harmonic channel blocks carry identical reference numerals but have a suffix "a". Other harmonics may be used for particular applications.

Output terminal 70 is coupled by line 72 to band pass filters 74, 74a. Filter 74 is tuned to 200 kHz, the fourth harmonic of the 50 kHz modulating frequency wave 36, and filter 74a is tuned to 300 kHz, the sixth harmonic of wave 36. Filters 74, 74a are coupled to amplifiers 76, 76a respectively which are coupled to second band pass filters 78, 78a respectively which are tuned to 200 kHz and 300 kHz, respectively. Filters 78, 78a are coupled to to amplifiers 80, 80a respectively which are coupled to third band pass filters 82, 82a respectively which are tuned to 200 kHz and 300 kHz respectively. Filters 82, 82a are coupled to synchronous detectors 84, 84a respectively. Counters 22, 30 are coupled to detectors 84, 84a, respectively, to provide 200 kHz and 300 kHz local oscillator signals on lines 86, 86a respectively to detectors 84, 84a.

Detectors 84, 84a recover the doppler signals which modulate the fourth and sixth harmonics inputs to detectors 84, 84a respectively, and feed the doppler signals to doppler amplifiers 88, 88a, respectively, each of which has a band pass of 10-100 Hz. Amplifiers 88, 88a are coupled to doppler detectors and filters 90, 90a respectively which are half wave peak detectors which rectify and filter the doppler frequency signals which are then fed to comparator 92. Comparator 92 has non-inverting (+) input terminal 94 and inverting (−) input terminal 96 and output terminal 98. Range indicator circuit 100 is coupled to output terminal 98.

In the operation of the circuit thus described, oscillator 20 generates in this example a 1.2 MHz square wave which is divided down by a factor of six by counter 22 to provide a 200 kHz signal to counter 24 and detector 84. Counter 30 divides down the 1.2 MHz signal from oscillator 20 by a factor of four to provide a 300 kHz signal to detector 84a. Counter 24 divides down the 200 kHz signal from counter 22 by a factor of four to provide a 50 kHz square wave to integrator 34 where the square wave is integrated as by an RC (resistancecapacitance) integrator circuit, known to the art, to provide a frequency modulating triangular wave 36 to RF VCO 46 which provides a triangular FM-CW signal having a suitable center frequency which is adjustable by voltage divider 44. The FM-CW signal is amplified by amplifier 50 and transmitted to target surface 56 where it is reflected and received by antenna 60 and fed to receiver mixer 62. Mixer 62 also receives a local oscillator signal from directional coupler 66 having the phase and frequency of the transmitted signal which is mixed with the reflected signal from target surface 56, the reflected signal having the range time difference and the doppler phase change associated with the relative velocity between the target surface 56 and the sensor antenna 52.

The mixed signal from mixer 62 has all of the harmonics of the 50 kHz modulating frequency. The fourth and sixth harmonics are filter selected by band pass filters 74, 78, 82 which are tuned to the fourth harmonic, and sixth harmonic band pass filters 74a, 78a, 82a which are tuned to the sixth harmonic. The fourth harmonic is amplified and synchronously detected by amplifiers 76, 80 and synchronous detector 84 and the sixth harmonic is amplified and synchronously detected by amplifiers 76a, 80a and synchronous detector 84a. The doppler frequency modulating the fourth harmonic is recovered by detector 84 and is amplified by amplifier 88 and detected and filtered by detector 90 and is fed to noninverting input 94 of comparator 92. The doppler frequency modulating the sixth harmonic is recovered by detector 84a and is amplified by amplifier 88a and detected and filtered by detector 90a and is fed to inverting input 96 of comparator 92.

When this invention is used as an altitude sensor in and for a falling body, the sixth harmonic doppler signal will amplitude peak at a higher altitude than the altitude at which the fourth harmonic doppler signal will amplitude peak. Thus when the sensor is just above a "height of function", which is an altitude between the altitudes at which the sixth and fourth harmonic doppler signals will amplitude peak, the sixth harmonic doppler signal amplitude exceeds the fourth harmonic doppler signal amplitude and comparator 92 output at terminal 98 will be inhibited from going "high". When the fourth harmonic doppler signal amplitude exceeds the sixth harmonic doppler signal amplitude then the signal at noninverting input terminal 94 exceeds in amplitude the signal at inverting input 96 and the output signal at terminal 98 will go "high" transmitting a signal to range indicator circuit 100 indicating that the desired height of function has just been reached.

The frequency deviation of the modulating frequency is set such that as the sensor descends toward the desired height of function after the sixth harmonic doppler signal has peaked, the sixth harmonic doppler signal amplitude decreases and the fourth harmonic doppler amplitude increases and they will be substantially equal at the desired height of function. In the particular disclosed embodiment comparator 92 is set so that comparator output at terminal 98 is inhibited when the amplitude of the sixth harmonic doppler signal is greater than one half of the amplitude of the fourth harmonic doppler signal and comparator 92 output goes "high" when the amplitude of the sixth harmonic doppler signal is less than one half of the amplitude of the fourth harmonic doppler signal. Other settings for comparator 92 may be used. A positive DC offset bias voltage is applied to the inverting input 96 by offset voltage circuit 102 to overcome any system and/or thermal noise and thus inhibit any false triggering of comparator 92 output.

Referring to FIG. 2 a block diagram is shown that is combined with the block diagram of FIG. 1, the connection points A, B, and C of the diagram of FIG. 1 being coupled respectively to the connection points A, B and C of the diagram of FIG. 2. The combination of the circuits in FIGS. 1 and 2 provides for automatically changing the frequency deviation after a first range has been reached to set the system for sensing a second range.

Power on indicator circuit 103 supplies leading edge waveform 101 to trigger monostable multivibrator 104 which then provides pulse 105 to counter 106, which receives at its input a 50 kHz signal at point A, and to input terminal #1 of the latch 108 resetting divide by 128 counter 106 and setting latch 108 outputs at terminals #3 and #4 "high" and "low", respectively. This, in turn, holds divide by 128 counter 110 and flip flop 112 in a reset condition and buffer 114 output "low". Flip flop 112 QNOT ($\overline{Q}$) output at terminal 113 is "high" when flip flop 112 is reset and this holds latch 116 output at terminal #3 "low", which in turn holds buffer 118 output "low".

When comparator 92 output at terminal 98 goes "high" upon the occurrence of reaching the first range, as previously explained, a signal is provided at point C to toggle latches 108 and 116. This causes latch 108 output 111 at terminal #4 to go "high" and provide a first range indication output through buffer 114 and also provides an enabling signal to integrator time constant control circuit 120 the output of which is coupled to integrator 34 at point B. Control circuit 120 has a manual adjustment for adjusting the time constant of integrator 34. A reduction of the time constant of integrator 34 increases the amplitude of the triangle wave form 36 and consequently increases the FM deviation of the FM modulated RF carrier from VCO 46. An increased deviation results in the major lobes of the fourth and sixth harmonics peaking at a closer range to the target. Conversely, a decreased deviation results in such peaking at a farther range from the target. At the same time latch 108 output at terminal #3 goes "low" and enables divide by 128 counter 110 and flip flop 112. Counter 110 divides the 390 Hz input 107 from counter 106 and provides a trigger pulse 109 to the input of flip flop 112 327 msec after latch 108 output at terminal #3 goes "low". This causes the QNOT output 115 at terminal 113 of flip flop 112 and input to latch 116 at terminal #1 to to "low" and enables latch 116 to be toggled by the output of comparator 92. The purpose of the 327 msec delay, during which the output of buffer 118 is inhibited, is to prevent transients which occur in the doppler amplifiers 88, 88a during the deviation switch over from causing a false output from buffer 118. When the second range condition between the sensor and the target occurs comparator 92 provides a "high" input to latch 116 at terminal #2 through point C which causes latch 116 output at terminal #3 to go "high" and provide a second range indication output through buffer 118.

One manner in which circuit 120 can adjustably vary the time constant in integrator 34 is to provide a signal to an FET (field effect transistor) which switches an adjustable resistance into parallel connection with the resistance of an RC integrator circuit in integrator 34. By variably setting the adjustable resistance, the RC time constant of integrator 34 correspondingly changes, thus changing the deviation. Thus by proper manual adjustment of the adjustable resistance the sensor can be tuned to an exact desired second range. Further additional range stages such as the stage disclosed in and described for FIG. 2 may be added in the manner of the FIG. 2 stage to provide additional pedetermined range indication signals. Other manners of varying the RC time constant in integrator 34 upon a next previous range indication signal may be used.

Referring to FIG. 3 a block diagram is shown that is combined with the block diagram of FIG. 1, the connection points D, E, and F of the diagram of FIG. 1 being coupled respectively to the connection points D, E and F of the diagram of FIG. 3. The stage of FIG. 3 adds an additional harmonic channel for band pass filtering, amplifying, synchronously detecting and doppler amplifying and detecting an additonal harmonic from mixer 62, which in this example is the eighth harmonic of the modulating frequency of 50 kHz. An additional comparator, comparator 92b, is used to compare the amplitudes of the sixth and eighth harmonic doppler signals. The blocks in the eighth harmonic channel shown in FIG. 3 are similar to corresponding blocks in the fourth and sixth harmonic channels of FIG. 1, the corresponding blocks in FIG. 3 carrying the same reference numerals as the blocks in FIG. 1 with the suffix "b". The corresponding blocks in FIGS. 1 and 3 perform similar functions except that the blocks of FIG. 3 are tuned to 400 kHz, the eighth harmonic of the modulating frequency of 50 kHz.

Band pass filters 74b, 78b, 82b are tuned to 400 kHz signal and synchronous detector 84b receives a 400 kHz LO signal from divide by 3 counter 30b on line 32b. Comparator 92b receives at noninverting terminal 94b the sixth harmonic doppler and at inverting input terminal 96b receives the eighth harmonic doppler signal and provides at output terminal 98b a "high" output when the sixth harmonic doppler signal to input 94b exceeds the eighth harmonic doppler signal to input 96b, comparator 92b being set as is comparator 92, indicating that a predetermined second range to the target is reached. The second range in this example is greater than the first range since the higher harmonics peak at greater ranges. Thus two specific ranges are signaled by the range indicators 100, 100b, respectively. Additional channels for additional harmonics may be similarly combined with the sensor of FIG. 3 to obtain signals for additional specific ranges, with the higher harmonics corresponding to greater ranges.

The two harmonics modulated by doppler signals that are compared to each other each may be selected from the total number of harmonics for desired results in desired applications. When the target is in relative receding motion to the sensor the numerical order of the selected harmonics is reversed.

While there have been described above the principles of this invention in connection with specific embodiments, it is to be understood that this is by way of example and is not limiting of the scope of this invention.

What is claimed is:
1. Target range sensing apparatus comprising:
   first means for generating a frequency modulated signal having a modulating frequency with a predetermined frequency deviation;
   second means coupled to said first means for transmitting said frequency modulated signal to a target;
   third means for receiving a reflection signal of said frequency modulated signal from the target;
   fourth means coupled to said first means and said third means for mixing said first means frequency modulated signal with said third means reflection signal to obtain a mixed signal having harmonics, range related time difference and doppler phase difference components;
   fifth means coupled to said fourth means for tuned filtering of said mixed signal to obtain one harmonic and at least one other harmonic of said harmonics and for detecting said one harmonic signal to obtain a first doppler signal and detecting said other harmonic signal to obtain a second doppler signal;
   sixth means coupled to said fifth means for comparing the amplitudes of said first and second doppler signals and providing a first output when said first doppler signal is greater in amplitude than said second doppler signal for indicating a predetermined range to the target.

2. The apparatus of claim 1 including seventh means coupled to said first means for providing a first frequency equal to said one harmonic of said modulating frequency and a second frequency equal to said other harmonic of said modulating frequency;
   said fifth means being coupled to said seventh means for synchronously detecting said one harmonic signal from said fourth means using said first frequency from said seventh means as a local oscillator signal to obtain said first doppler signal and synchronously detecting said other harmonic signal from said fourth means using said second frequency from said seventh means as a local oscillator signal to obtain said second doppler signal.

3. The apparatus of claim 1 wherein said fifth means comprises means for tuned filtering of a second other harmonic to obtain a third doppler signal;
   said sixth means comprises means for comparing the amplitudes of said second and third doppler signals and providing a second output when said second doppler signal is greater in amplitude than said third doppler signal for indicating a second range to the target.

4. The apparatus of claim 1 including eighth means coupled to said sixth means for sensing said output of said sixth means;
   said eighth means being coupled to said sixth means and said first means for receiving said first output of said sixth means and thereupon adjusting the frequency deviation of said modulating frequency in said first means so that with a predetermined adjustment of said frequency deviation said sixth means will provide a second output indicative of a second range to said target corresponding to said adjustment in said frequency deviation when said first doppler signal is compared by said sixth means to said second doppler signal and said first doppler signal is greater in amplitude than said second doppler signal.

5. Target range sensing apparatus comprising:
   means for generating a first frequency;
   second means coupled to said first means for providing a first and a second divided frequency of said first frequency;
   third means coupled to said first means for frequency modulating a predetermined carrier frequency at a modulating frequency to provide a frequency modulated signal; said modulating frequency being a predetermined first fraction of said first divided frequency and a predetermined second fraction of said second divided frequency whereby said first divided frequency is one harmonic of said modulating frequency and said second divided frequency is another harmonic of said modulating frequency;

fourth means coupled to said third means for transmitting said frequency modulated signal to a target;

fifth means for receiving a reflection signal of said frequency modulated signal from the target;

sixth means coupled to said third means and said fifth means for mixing said third means frequency modulated signal with said fifth means reflection signal to obtain a mixed signal having harmonics of said modulating frequency and doppler frequency components;

seventh means coupled to said sixth means for filtering said mixed signal to obtain said one harmonic and said another harmonic;

eighth means coupled to said second means and said seventh means for synchronous detecting said one harmonic signal from said seventh means using said first divided signal from said second means as a local oscillator signal to obtain a first doppler signal and synchronous detecting said another harmonic signal from said seventh means using said second divided signal from said second means as a local oscillator signal to obtain a second doppler signal;

ninth means coupled to said eighth means for comparing the amplitudes of said first and second doppler signals and providing a first output when said first doppler signal is greater in amplitude than said second doppler signal to indicate a first target range.

6. The apparatus of claim 5 including tenth means coupled to said ninth means and said third means for providing a signal to said third means for changing the frequency deviation of said modulating frequency upon said first output of said ninth means so that said ninth means provides a second output when said first doppler signal is greater in amplitude than said second doppler signal to indicate a second range.

7. The apparatus of claim 5 wherein said second means comprises means for providing a third divided frequency of said first frequency;

said modulating frequency of said third means being a third fraction of said third divided frequency whereby said third divided frequency is a second another harmonic of said modulating frequency;

said seventh means comprises means for obtaining said second another harmonic;

said eighth means comprises means for synchronous detecting said second another harmonic from said seventh means using said third divided signal from said second means as a local oscillator signal to obtain a third doppler signal;

said ninth means comprises means for comparing the amplitudes of said second and third doppler signals and providing a second output when said second doppler signal is greater in amplitude than said third doppler signal to indicate a second range to the target.

* * * * *